United States Patent [19]

Cormack

[11] Patent Number: 4,461,606
[45] Date of Patent: Jul. 24, 1984

[54] SUPPORTING GRIP FOR BIN OR HOPPER
[75] Inventor: Alexander D. Cormack, Marietta, Ga.
[73] Assignee: S.W. Hooper & Co. Ltd., Montreal, Canada
[21] Appl. No.: 515,887
[22] Filed: Jul. 21, 1983

Related U.S. Application Data

[63] Continuation of Ser. No. 269,615, Jun. 2, 1981, abandoned.

[51] Int. Cl.³ .................... B65G 65/44; B65G 65/46
[52] U.S. Cl. .................................... 414/325; 222/564
[58] Field of Search .............. 222/199, 200, 328, 564; 414/304, 325, 326, 327; 52/650, 664

[56] References Cited

U.S. PATENT DOCUMENTS

| | | | |
|---|---|---|---|
| 1,385,254 | 7/1921 | Luft | 222/459 |
| 3,231,111 | 1/1966 | Clar | 414/525 |
| 3,285,438 | 11/1966 | Howell et al. | 222/564 |
| 3,934,737 | 1/1976 | Cumpston, Jr. | 414/304 |
| 4,157,761 | 6/1979 | Debor | 414/304 |

FOREIGN PATENT DOCUMENTS 702338  1/1954  United Kingdom ............... 414/327

Primary Examiner—Robert B. Reeves
Assistant Examiner—David F. Hubbuch
Attorney, Agent, or Firm—Larson and Taylor

[57] ABSTRACT

A load supporting grid structure is disclosed for a bin or hopper having a discharger or reclaimer at the bottom. The grip structure is used when storing solid materials such as wood chips, hogged fuel and the like and reduces the weight of the solid materials on the discharger, particularly when the materials are stored at a depth of at least 20 feet. The grid structure is positioned above the discharger and supports the weight of at least a portion of the solid materials in the bin or hopper.

7 Claims, 2 Drawing Figures

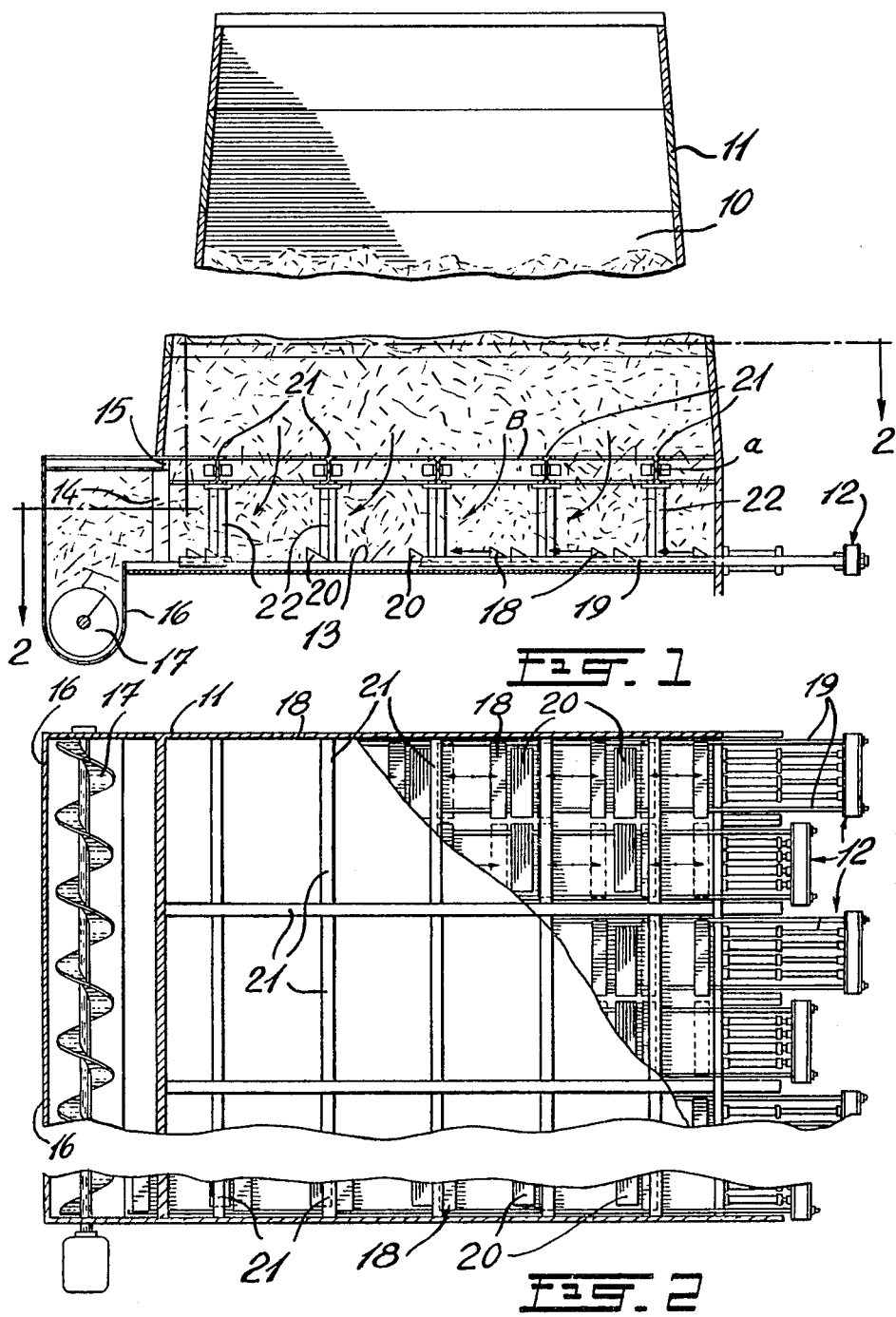

SUPPORTING GRIP FOR BIN OR HOPPER

This application is a continuation of application Ser. No. 269,615 filed June 2, 1981, now abandoned.

The present invention relates to a bin or hopper having a discharger or reclaimer at the bottom. More specifically, the present invention is directed to a load supporting grid structure in a bin or hopper having a discharger or reclaimer at the bottom thereof.

When material such as wood chips or hogged fuel are stored in a deep bin or hopper they tend to pack down with the resulting increase in density of the material at the bottom, causing separate pieces to lock together. Hogged fuel is made from saw mill refuse which has been fed to a disintegrator, or hog, so that the various sizes and shapes of refuse are reduced to a relatively uniform size of chips or shreds. When material is then removed from underneath this bin or hopper, bridging of these locked pieces occurs resulting in cavities in the packed material which prevents discharge from the bin or hopper. These cavities cause interruption in the normal discharge of material from the bin or hopper. To restore normal operations, such devices as air cannons and vibrators have been used to break up the bridged material and prevent cavities from being formed. Such devices are troublesome and not always effective.

In deep bins or hoppers the entire weight of material being stored is presently supported by the floor. In many cases the floor has a discharger, such as a live bottom stoker discharger, a live bottom screw discharger, or a live bottom chain discharger. When the entire weight of the material rests on the floor and discharger, tremendous forces are necessary to move the material and the power to operate the discharger is high due to the pieces of material being sheared against and through adjacent pieces of material. The discharge of solid materials requires high unit shear pressures resulting in high power requirements for the discharger mechanisms.

It is a purpose of the present invention to reduce the material weight on the floor of bins and hoppers. It is also a purpose to provide a bin or hopper for solid materials with a discharger or reclaimer at the bottom, that avoids the problems of bridging and cavities in the packed material causing interruptions in the discharge.

The present invention provides in a bin or hopper for storing solid materials to a depth of at least 20 feet, the bin or hopper having a discharger means at the bottom thereof, the improvement comprising a load supporting grid structure in the bin or hopper positioned above the discharger means to support the weight of at least a portion of solid materials in the bin or hopper.

In other embodiments the grid structure is located in the approximate range of 2-10 feet above the bottom of the bin or hopper, and the grid structure is formed of I-beams. If the bin or hopper is used for wood chips, then preferably the structure is formed of beams perpendicular to each other at a distance apart in the approximate range of 8-14 feet. If the bin or hopper is to be used for hogged fuel, the grid structure is formed of beams perpendicular to each other at a distance apart in the approximate range of 12-14 feet.

In drawings which illustrate the embodiments of the invention,

FIG. 1 is a cross sectional side view of a hopper having a load supporting grid structure according to one embodiment of the present invention.

FIG. 2 is a sectional view at line 2—2 of FIG. 1.

Referring now to the drawings, a bin or hopper 10 having tapering sides 11 so that the top is narrower than the base, has a live bottom stoker 12 on the floor 13, which discharges material through a discharge opening 14 beneath a shear beam 15 in one side of the hopper 10. The material drops into a trough 16 having a screw conveyor 17 therein.

The live bottom stoker 12 shown in the drawings is a reciprocating mechanism having stoker cross bars 18 mounted on two reciprocating longitudinal stoker arms 19 with fixed cross bars 20 therebetween. The stoker cross bars 18 are tapered at one side, so that the material is pushed when the cross bar 18 moves in one direction, and then slides under the material on the return stroke. The fixed cross bars 20 prevent the material from moving backwards when the stoker cross bars 18 are on the return stroke. As illustrated in FIG. 2, a plurality of mechanisms are mounted side by side with adjacent stoker mechanisms 12 reciprocating out of phase with each other, to assist in the preventing of bridging or plugging of the solid materials. One example of such a discharger mechanism is illustrated in U.S. Pat. No. 4,157,761 to Debor, issued June 12, 1979.

In the embodiments shown in the figures, the discharge exits at one end of the bin or hopper, however, the bin or hopper may be arranged to have exits at either end or both ends, or even in the center. If a live bottom screw is installed in place of the stoker mechanism, then this may be a fixed screw with a plurality of screw feeds along the bottom of the hopper. Alternatively, there may be a movable linear gear drive or linear chain drive reciprocating a single screw feed to empty the hopper. There may also be a rotating chain drive for reciprocating a single screw feed across the floor of the hopper, or a live bottom chain reclaimer, wherein a chain drags links across the floor of the hopper.

A structural steel grid 21 is shown comprising cross beams substantially perpendicular to each other, having the top surface of all the beams in the same plane with the bottom of the structural steel beams being in line with the shear beam 15. The structural grid 21 is preferably made of I-beams or other standard structural members, such as channels, wide flange beams, etc. The structural grid is designed to support at least a portion of the solid materials in the hopper. The steel grid 21 extends beyond the sides 11 of the bin or hopper 10 as shown in FIG. 2 and has a supporting structure (not shown) to transfer the weight of the material above the steel grid 21 away from the floor 13 of the hopper 10. In this manner the weight of the material on the floor 13 of the hopper 10 represents the material between the floor 13 and the steel grid 21, plus some additional weight of the material in the spaces of the grid structure. Intermediate columns 22 are located at the intersections of the steel grid and extend down between the stoker mechanisms 12. Structural supports (not shown) beneath the floor support the columns 22 and hence the grid structure 21. Such a grid is useful when the depth of material in the hopper is 20 feet or more. Less than 20 feet produces little advantage because the loading from such a height does not substantially affect the power requirement of the discharger mechanism and bridging or plugging of the material does not often occur. The spaces between the beams are sufficient to permit the passage of solid materials to pass through down to the discharger mechanism, and also sufficient to prevent bridging occurring in the packed material to restrict material dropping down to the discharger mechanism.

In the embodiments shown, the bottom of the structural steel grid 21 is shown to be in line with the shear beam 15. This is not essential, there are some applications where the grid is located closer to the floor than the shear beam, and in a preferred embodiment the grid structure is located in the approximate range of 2-10 feet above the floor 13 of the bin or hopper.

The spacing of the structural steel grid 21 varies depending on the materials to be stored in the bin. For example, wood chips should preferably have beams with a center distance apart in the approximate range of 8-14 feet. In the case of hogged fuel, the grid structure is formed of beams substantially perpendicular to each other with a center distance apart in the approximate range of 12-14 feet. Other materials require different spacing depending on their tendency to pack together and bridge. Examples of other applications include, sawdust, municipal waste, shavings, logs and hogged fuel, and other types of shredded waste residues including bark.

In operation when the bin is filled with solid materials, a large portion of the weight of the material above the grid structure is supported by the grid structure, thus this means that the weight of material on the discharger mechanism represents only a small portion of the weight of material in the bin. This means that the operation of the discharger mechanism does not require the same power to move the material as it would were the full head of solid materials resting on the floor of the bin.

In one example a storage bin was made to store and discharge spruce and balsam wood chops. The bin was 48 ft. wide 40 ft. long and 50 ft. high and has a storage volume of over 100,000 cubic feet when filled to capacity. The discharge mechanism consisted of eight live bottom stoker mechanisms which were designed to have adjacent stoker mechanisms reciprocating out of phase with each other. The wood chips have a density of about 16 to 20 lbs/cu.ft. and the range of discharge from the stoker mechanisms is in the range of about 618 to 4125 cubic feet per hour or about 10,000 to 80,000 lbs. per hour.

The stoker mechanisms are each 5½ ft. wide by 40 ft. long, each unit is powered by four 6" diameter hydraulic cylinders. The bin is equipped with a structural steel grid made from W21×73 structural steel beams with spacings of 10 ft. centersfrom front to back and 12 ft. 4 in. centers across the width of the bin. The top surface of the grid is approximately 8 ft. above the floor of the bin, allowing a height distance from the grid to the top of the bin of 50 ft. The width of each steel beam is approximately 8½ inches.

Various changes may be made to the steel grid 21. The width of the top surface of the beams is selected to suit the material stored in the bin, as is the spacing between the beams. The support for the grid 21 is preferably separate from the hopper or bin. The scope of the present invention is limited only by the claims.

The embodiments of the invention in which an exclusive property or privilege is claimed are defined as follows:

1. In a bin or hopper for storing solid materials to a depth of at least 20 feet, the bin or hopper having a continuous discharger means at the bottom of the solid materials, the improvement comprising a fixed load supporting grid structure in the bin or hopper, positioned above the discharger means to support the weight of only a large portion of solid materials in the bin or hopper above the discharger, the uppermost portions of said grid being a continuous spaced series of perpendicular beams with flat surfaces which are disposed in a single plane with the spaces between said grid sufficient to allow continuous passage of the solid materials to the continuous discharger means.

2. In the bin or hopper according to claim 1 wherein the grid structure is located in the approximate range of 2-10 feet above the bottom of the bin or hopper.

3. In the bin or hopper according to claim 2 wherein a shear beam at one side of the bin or hopper represents the top of a discharge opening, and the bottom of the grid structure is in substantially the same plane as the base of the shear beam.

4. In the bin or hopper according to claim 1 wherein the grid structure is formed of I-beams.

5. In the bin or hopper according the claim 1 wherein the solid material is wood chips, and the beams substantially perpendicular to each other are at a distance apart in the approximate range of 8-14 feet.

6. In the bin or hopper according to claim 1 wherein the solid material is hogged fuel, and the beams substantially perpendicular to each other are at a distance apart in the approximate range of 12-14 feet.

7. In a bin or hopper for storing solid materials to a depth of at least 20 feet, the bin or hopper having a continuous discharger means at the bottom of the solid materials, the improvement of reducing the weight of solid materials on the discharger means, comprising a fixed load supporting grid structure with cross substantially perpendicular to each other beams, said cross beams forming a continuous spaced series of flat top surfaces disposed in a single load surface plane above the discharger means to support the weight of only a large portion of the solid materials in the bin or hopper above the discharger, and spaces between the cross beams sufficient to allow continuous passage of the solid materials to the continuous discharger means.

* * * * *